Apr. 3, 1923.   B. M. TALLEY   1,450,764
ANTISKID TIRE PROTECTOR
Filed Nov. 23, 1921

Inventor
B. M. Talley,
By
Attorney

Patented Apr. 3, 1923.

1,450,764

UNITED STATES PATENT OFFICE.

BERRY MARTIN TALLEY, OF MORROW, ARKANSAS.

ANTISKID-TIRE PROTECTOR.

Application filed November 23, 1921. Serial No. 517,256.

*To all whom it may concern:*

Be it known that BERRY M. TALLEY, a citizen of the United States of America, residing at Morrow, in the county of Washington and State of Arkansas, has invented new and useful Improvements in Antiskid-Tire Protectors, of which the following is a specification.

The object of the invention is to provide a simple, inexpensive and efficient protector for the tires of automobiles and similar motor driven vehicles employing pneumatic and cushion tires and also designed to serve as an anti-skid tread for the same and particularly to provide a device of this type wherein the tread elements may be constructed from worn and otherwise discarded remnants of tires or casings such as are used in connection with vehicles of this type; and with this object in view the invention consists in a construction and combination of parts of which a preferred embodiment is shown in the accompanying drawings, wherein:—

The device consists essentially of a series of tread elements 10 adapted to be arranged and held in spanning relation with the tread portion of a vehicle tire 11, said tread elements preferably consisting of cross sections of a pneumatic tire casing or shoe of the clincher type and thus providing for the clincher beads 12 on the extremities of the strips forming said tread elements.

Figure 1:
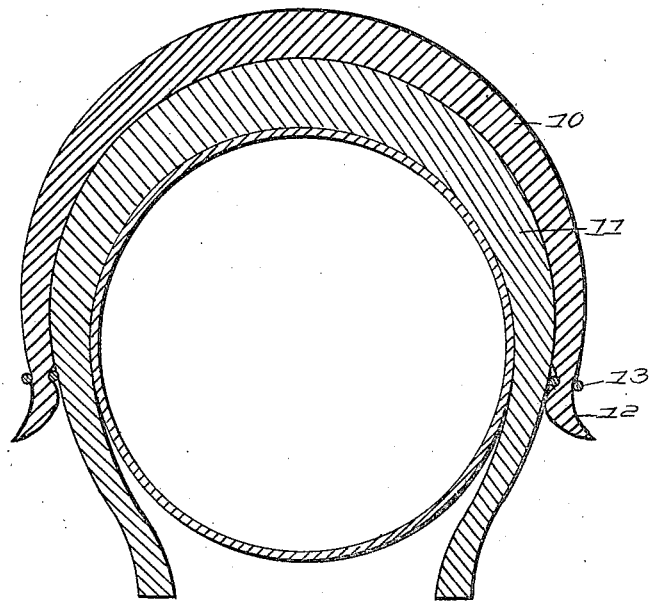
Figure 1 is a cross sectional view of a protector embodying the invention applied in the operative position to a tire.
Figure 2:
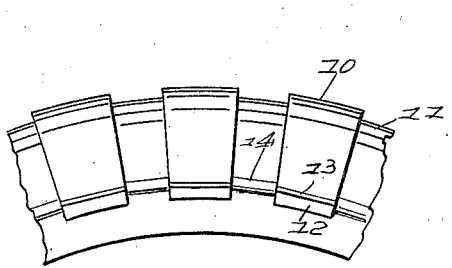
Figure 2 is a side view of a portion of the same.
Figure 3:
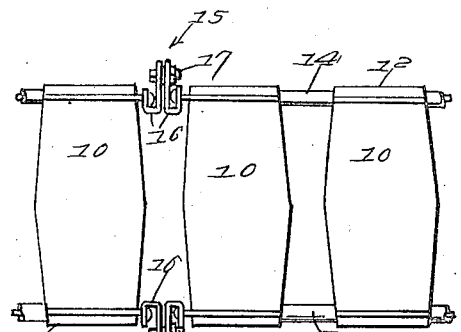
Figure 3 is a plan view of the protector showing the portion thereof adjacent to the joints between the runners or connections.

The tread elements are secured together in a series with the elements arranged in spaced relation as shown in Figures 2 and 3, by means of a flexible runner or connection 13 of wire or cable of the two-ply or double strand type, so that the numbers of the connection or runner represented by the said strands may lie in contact with opposite or in other words inner and outerside surfaces of the terminals of the tread elements in engagement with the beads, to form an interlocking connection between the tread elements and the runners or connections. The strands or plies of the connections or runners, in the intervals between the adjacent edges of the tread elements are extended through tubular spacers 14 which serve to determine the intervals between said tread elements while maintaining the engaged portions of the strands or plies of the connections or runners in such relation as to clamp the terminals of the tread elements between the intermediate portions of said strands or plies,—that is to say the portions thereof intermediate between the successive spacers.

Fastening means 15 are provided for connecting the terminals of the runners or connections to secure the protector on the wheel tire and in the construction illustrated these fastening means consist of clips 16 of U-shaped formation having one leg longer than the other and the extremities of the runners connected to the shorter leg, thus disposing the longer legs of the complemental clips adjacent each other. These longer legs are spanned by bolts 17 and which, when tightened, serve to properly tension the runners or connections.

It will be obvious that by using cross sectional portions or segments of worn and otherwise useless tire casings or shoes as the tread elements of the protector, the device may be constructed at a relatively small cost inasmuch as the only further elements thereof consist of the means for flexibly connecting and holding said tread elements in series so that they may be properly positioned in spanning relation with the tread surface of the tire.

Having described the invention, what is claimed as new and useful is:—

A tire protector consisting of flexible transverse tread elements in spanning relation with the tire, flexible runners to which said tread elements are secured and uniformly spaced from each other, and fasteners for the terminals of said runners consisting of complemental U-shaped members of which one leg is shorter than the other, the shorter legs being secured to the terminals of the runners and the longer legs disposed adjacent each other, and bolts spanning the longer legs to exert tension on the runners.

In testimony whereof he affixes his signature.

BERRY MARTIN TALLEY.